(12) United States Patent
Radner (10) Patent No.: US 8,903,652 B2
(45) Date of Patent: Dec. 2, 2014

(54) NAVIGATION DEVICE POSITIONING SYSTEM (75) Inventor: Markus Radner, Munich (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 88 days.

(21) Appl. No.: 13/444,552

(22) Filed: Apr. 11, 2012

(65) Prior Publication Data
US 2012/0265439 A1 Oct. 18, 2012

(30) Foreign Application Priority Data

Apr. 14, 2011 (EP) ..................................... 11162466

(51) Int. Cl.
G01C 21/10 (2006.01)
G01C 21/28 (2006.01)
G01C 21/00 (2006.01)

(52) U.S. Cl.
CPC .............. *G01C 21/28* (2013.01); *G01C 21/00* (2013.01)
USPC .......................................... 701/468; 701/445

(58) Field of Classification Search
USPC ......... 701/468, 428, 533, 445, 467, 532, 431, 701/472; 340/988, 991, 995.18, 995.24; 342/457
See application file for complete search history.

(56) References Cited

U.S. PATENT DOCUMENTS

2005/0107953 A1 5/2005 Sugla ............................. 701/300
2007/0018811 A1 1/2007 Gollu ....................... 340/539.13
2010/0138143 A1* 6/2010 Kanematsu et al. .......... 701/200

FOREIGN PATENT DOCUMENTS

JP 2011-069790 A 4/2011

OTHER PUBLICATIONS

European Search Report issued in European Application No. 11162466.4 dated Oct. 7, 2011, 6 pgs.

* cited by examiner

*Primary Examiner* — Thomas G Black
*Assistant Examiner* — Luke Huynh
(74) *Attorney, Agent, or Firm* — Patterson + Sheridan, LLP (57) ABSTRACT A navigation system may determine an approximate position of a navigation device and determine a geographical area in which the navigation device is located based on the approximate position. The determined geographical area may be one of a plurality of geographical areas included in a routing area. Each geographical area may be associated with one of a plurality of positioning procedures each associated with a predetermined parameter set. The navigation system may select the positioning procedure associated with the determined geographical area and determine the position of the navigation device according to the selected positioning procedure and the associated predefined parameter set.

22 Claims, 4 Drawing Sheets

NAVIGATION DEVICE POSITIONING SYSTEM

PRIORITY CLAIM

This application claims the benefit of priority from European Patent Application No. 11 162 466.4, filed Apr. 14, 2011, which is incorporated by reference.

BACKGROUND OF THE INVENTION

1. Technical Field

The present invention relates to a system for determining a position of a navigation device, and to a corresponding navigation device.

2. Related Art

Navigation systems or navigation devices for guiding a user from a starting position, for example, a current position of the user, to a destination position are well-known in the art. After having calculated a route from the starting position to the destination position, a current position of the user is determined Based on this current position, the calculated route guidance information may be output to the user by optical and/or acoustical means. For example, a map indicating the current position of the user and the calculated route may be displayed on a display of the navigation system. For determining the guidance information and for detecting if the user is deviating from the calculated route, an accurate determination of the current position of the user is required.

SUMMARY

A navigation system may determine an approximate position of a navigation device and determine a geographical area in which the navigation device is located based on the approximate position. The determined geographical area may be one of a plurality of geographical areas included in a routing area. Each geographical area may be associated with one of a plurality of positioning procedures each associated with a predetermined parameter set. The navigation system may select the positioning procedure associated with the determined geographical area and determine the position of the navigation device according to the selected positioning procedure and the associated predefined parameter set.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

In one example, the navigation system may determine the current position from a plurality of information sources. For example the navigation system may determine the current position from a satellite based system (e.g., global positioning system (GPS) or Galileo), from radio based mobile telecommunications networks, or from telemetric data of the vehicle (e.g., tachometer data or speed data). In some situations, an accurate determination of the current position may be difficult, as the provided positioning information from one or more of the different sources may be contradictory or inaccurate. For example, in street canyons of big cities, a positioning signal from a satellite may be inaccurate due to reflections or due to a disturbed reception. Furthermore, on roads having a plurality of lanes, it may be difficult to determine in which lane the vehicle is moving. However, this may be important to guide a driver of the vehicle on the correct lane when the driver is to take a specific exit for following the calculated route.

In one example, a system for determining a position of a navigation device is provided. The navigation system may be adapted to determine a position of the navigation device based on a plurality of different positioning procedures. In one example, the plurality of different positioning procedures may be provided, and each positioning procedure may work with a predefined parameter set. Additionally, or alternatively, a plurality of geographical areas may be provided, and each geographical area may be associated with one of the positioning procedures. In some examples, one positioning procedure may be assigned to one or more geographical areas. An approximate position of the navigation device may be determined. The approximate position may be determined, for example, based on a single positioning information source (e.g., a satellite based global positioning system or a mobile telecommunications network). The approximate position may be a position which is determined with an accuracy of, for example, a few 100 meters. The accuracy of the approximate position may be sufficient to determine in which one of the plurality of geographical areas the navigation device is located. Thus, the accuracy of the approximate position may be greater (i.e., the approximate position may be more accurate) in an area where the sizes of the plurality of geographical areas are small. In other words, it may be beneficial to determine a more accurate approximate position to distinguish between relatively small geographical areas to determine in which area the navigation device is located. Thus, the accuracy of the approximate position may vary based on the position of the navigation device. In case the accuracy of the approximate position is not high enough to uniquely identify one of the geographical areas, the method as described herein may be performed recursively starting with an assumed approximate position. Based on the determined geographical area, the associated positioning procedure of the plurality of positioning procedures may be selected and used for determining a more accurate position of the navigation device. The plurality of different positioning procedures may include different positioning algorithms and/or different predefined parameter sets to determine the position of the navigation device. Additionally, or alternatively, the different positioning procedures may rely on the same algorithm, and the predefined parameter sets of the different positioning procedures may be varied. Thus, an improved positioning can be achieved for different geographical areas. By utilizing the knowledge of typical positioning problems of certain geographical areas in the positioning procedures, an improved positioning can be provided with a positioning procedure adapted to the geographical area.

In one example, at least one parameter of the predefined parameter set may define a weighting for a positioning information source. The positioning information source may provide a positioning information for the positioning procedure. The weighting may define a weight for scaling the positioning information from the positioning information source when the position of the navigation device is determined based on the positioning information of the positioning information source. For example, the positioning information sources may include a satellite based global positioning device, a steering angle sensor of a steering wheel of the vehicle, a tachometer sensor of the vehicle, an inclination angle sensor of the vehicle indicating, for example, if the vehicle is driving up or down a hill, a gyro sensor indicating a rotation of the vehicle body, a mobile communications network based positioning device providing positioning information from a radio based mobile communications network, or an electronic toll collect based positioning device providing an information of a position of an electronic toll collect area (e.g., a toll collect bridge) the vehicle is passing. In other examples, the positioning information source may include any other source of information related to the position of the navigation device. When a plurality of the positioning information sources provide a positioning information, the plurality of positioning information may deviate from each other, or may be contradicting. In other words, the positioning information provided by one positioning information source may not be the same as the positioning information provided by another positioning information source. Thus, the position of the navigation device determined based on the positioning information from the one positioning information source may not be the same as the position of the navigation device determined based on the positioning information from the other positioning information source. By weighting each of the positioning information delivered from the different positioning information sources, a reliability of each of the positioning information sources can be considered. As the weighting may be different for different geographical areas, each positioning information source can be appropriately considered for determining the position of the navigation device. For example, in areas where a satellite based global positioning information may be corrupted due to reflections in street canyons or may provide a poor reception quality (i.e., in a geographical area where the expected reception quality is poor), the weighting of the satellite based global positioning information may be low, whereas in other areas, where a good reception of the satellite based global positioning information is expected, the weighting may be high.

In another example, at least one parameter of the predefined parameter set may define a road information such as, for example, a lane width, a number of lanes, or a turning angle threshold. In other examples, the road information may include any information related to one or more streets or roads within the geographical area. The road information may be related to characteristics of the streets or roads of the geographical area that may affect the expected operation of a vehicle on the road. For example, the road information may be related to an expected speed of the vehicle on the road, an expected position of the vehicle on the road (e.g., the lane in which the vehicle is expected to travel), an expected turning angle used to change lanes or turn onto another road, an expected inclination angle of the vehicle on the road, or an expected acceleration (e.g., in the direction of travel or in a transverse direction) of the vehicle on the road. The road information may be used by the navigation system to determine the position of the navigation device. In one example, a lane width within one geographical area (e.g., a first city) may be different compared to a lane width within another geographical area (e.g., a second city). By adapting a lane width depending on the geographical area in which the navigation device is located, a current position or a deviation from a road can be determined more accurately. In other words, by taking into account the road information corresponding to the geographical area in which the navigation device is located, the current position of the navigation device or the deviation from an expected current position (e.g., on a road or along a calculated route) may be determined with greater accuracy. In another example, in some geographical areas, road branches typically may have small angles whereas, in other geographical areas, road branches typically may have larger angles. Different turning angle thresholds may be used in different geographical areas to determine if the vehicle is departing from a road at a road branch. For example, in areas with larger angles at road branches, the vehicle may turn significantly for a detection that the vehicle is exiting the road at the road branch. In other words, the navigation system may detect that the vehicle is exiting the road at the road branch in response to the turning angle of the vehicle exceeding the turning threshold. The turning threshold may be higher in geographical areas with larger angles at road branches and lower in geographical areas with smaller angles at road branches. The turning threshold may be higher or lower based on the road information Additionally, or alternatively, the turn angle threshold may be used to detect a lane change. In some geographical areas, a lane change may be detected in response to a significant turn (i.e., a larger turn angle), whereas in other geographical areas, a lane change may be detected in response to a slight turn (i.e., a smaller turn angle).

The geographical areas may include, for example an urban region, a rural region, a specific city, a mountainous region, a flat region, a specific country, a specific district area, or a specific road. Additionally, or alternatively, especially within large cities, different geographical areas may be defined within one city. For example, for cities having a ring structure (e.g., Beijing), the geographical areas may be associated with the rings of the city or even to the ring roads themselves.

According to an embodiment, the plurality of different positioning procedures includes a default positioning procedure which is used to determine the position of the navigation device when no geographical area can be determined based on the approximate position of the navigation device. Thus, in case the approximate position cannot be determined or no specific positioning procedure is defined for the current geographical position, the default positioning procedure will be used.

In one example, a navigation system may include a processing unit, a memory, and a positioning unit. The memory may be adapted to store a plurality of positioning procedures. Each positioning procedure may work on a predefined parameter set, which may be stored in the memory. In other words, each positioning procedure may function based on the predefined parameter set, which may be stored in the memory. Additionally, or alternatively, the memory may be adapted to store a plurality of geographical areas and an association associating each of the geographical areas with one of the positioning procedures. Storing the plurality of geographical areas may include storing geographical information describing the geographical area. For example, the geographical information of a geographical area may describe a contour of the geographical area. The positioning unit may be adapted to determine an approximate position of the navigation device (e.g., a current position of a user and/or a current position of a vehicle). The positioning unit may determine the approximate position of the navigation device, for example, based on an absolute positioning information provided by, for example, a satellite based global positioning system or a mobile communications network based positioning system. Additionally, or alternatively, the positioning unit may determine the approximate position based on a previously determined position of the navigation device and a relative change in position based on, for example, a steering angle sensor or a tachometer sensor of a vehicle in which the navigation device is installed, or based on an acceleration sensor. The processing unit may be adapted to determine a position of the navigation device based on the plurality of positioning procedures. In one example, the processing unit may determine a geographical area in which the navigation device is located based on the approximate position of the navigation device. The processing unit may select one of the plurality of positioning procedures based on the determined geographical area. Based on the selected positioning procedure, the position of the navigation device may be determined with greater accuracy.

The navigation device may include a mobile personal navigation device or a vehicle navigation device installed in a vehicle, such as an automobile, a boat, an airplane, or any other passenger carrying conveyance. The mobile personal navigation device may be a hand-held device which may be used inside and/or outside a vehicle. The navigation device of the vehicle may include a navigation device installed in the vehicle or may be part of an entertainment system or control system of the vehicle.

It is to be understood that this description of various examples is not to be taken in a limiting sense. Rather, the scope of the invention is defined only by the appended claims and not intended to be limited by the examples described herein.

It is to be understood that the features of the various examples described herein may be combined with each other, unless specifically noted otherwise. However, describing an embodiment with a plurality of features is not to be construed as indicating that all of those features are necessary for practicing the present invention, as other examples may include fewer features and/or alternative features.

Figure 1:
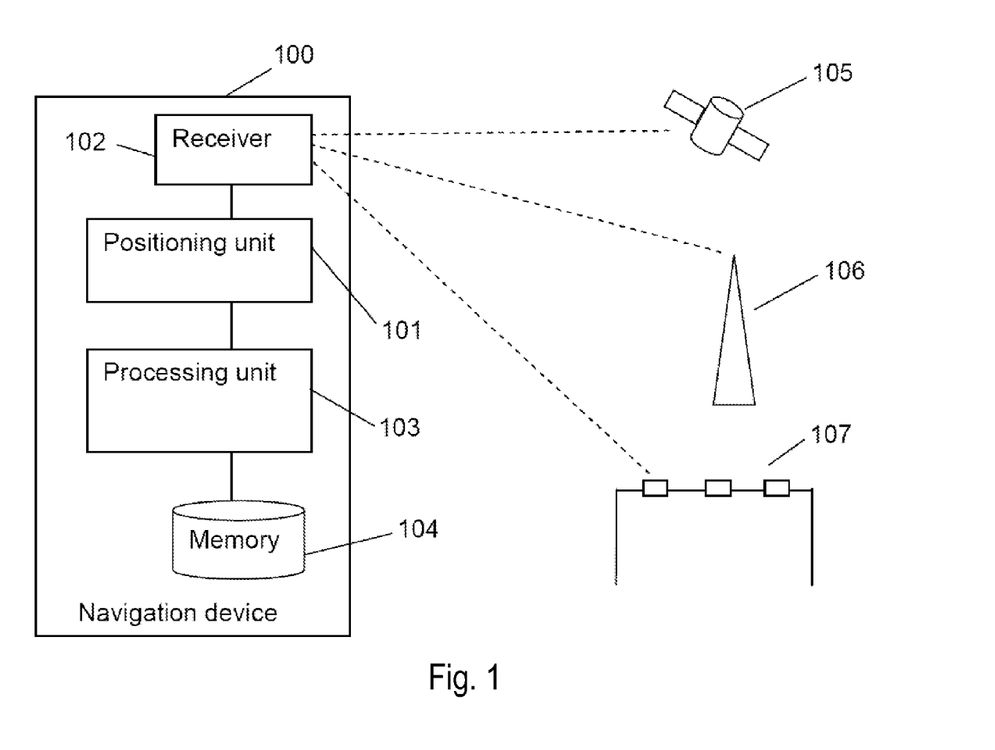
FIG. 1 shows a schematic view of one example of a navigation system.

FIG. 1 shows one example of a navigation system 100 including a positioning unit 101 connected to a receiver 102, a processing unit 103, and a memory 104. The navigation system 100 may be a stand-alone navigation device. The navigation system 100 may include and/or be interfaced to various devices and/or systems. In other examples, the functionality of the navigation system 100 may be distributed such that a portion of the navigation system may be included in a user navigation device that moves with a user, and a portion of the functionality of the navigation system may be external to the navigation device, such as located in a server, a vehicle, or in any other computing system. The positioning unit 101 may determine the position of the navigation device and/or a user, such as a user traveling in a vehicle in which at least part of the navigation system 100 may be installed or operated. For example, the positioning unit 101 may include and/or be coupled to the receiver 102, which may be configured as a global positioning system (GPS) receiver or a comparable satellite positioning system receiver for receiving positioning signals from navigation satellites. In other examples, the positioning unit 101 and/or the receiver 102 may be configured as any other form of mobile positioning system, such as a beacon system, an angle of arrival system, an arrival time system, or any combination thereof. A digital map representation, positioning information, predefined parameter sets, geographical information, road information, operating instructions and/or any other data or instructions related to the navigation system 100 may be stored in a database (e.g., the memory 104) and/or any other memory or memory device. The database may include, for example, one or more of a hard disk device, a CD-ROM device, a DVD device, a ROM memory device, or any other one or more non-transitory data storage devices. In addition, rewritable non-volatile memory, such as flash memory, may be provided to store data and information in a flexible way and/or to maintain the stored information even in the case of a power outage.

The processing unit 103 may perform operation aspects of the navigation system 100, such as providing navigation information (i.e., visual and/or audio output) to the vehicle user (e.g., the driver). The processing unit 103 may be configured to include a general processor, a digital signal processor, application specific integrated circuit, field programmable gate array, analog circuit, digital circuit, server processor, combinations thereof, or other now known or later developed processor. The processing unit 103 may be configured as a single device or combination of devices, such as associated with a network or distributed processing. Any of various processing strategies may be used, such as multi-processing, multi-tasking, parallel processing, remote processing, centralized processing or the like. The processing unit 103 may be responsive to or operable to execute instructions stored as part of software, hardware, integrated circuits, firmware, micro-code, or the like.

The navigation system 100 may include various output devices to present or annunciate the navigation information to the user. The output devices may include a display, a loudspeaker, and/or any other type of output device configured to output information to a user. The display may be a full graphic display, such as, for example, a liquid-crystal display, a thin-film transistor display, or a cathode-ray tube display. Additionally, or alternatively, the display may be a projection display, such as a head-up display in which optical information may be projected onto a windscreen, or other surface of the vehicle. The display may be combined with one or more input devices. For example, the display may be configured as a touchscreen device. In other words, the display may include a touchscreen adapted to display information to a user of the navigation system 100 and adapted to receive inputs from a user of the navigation system 100 touching operating areas displayed on the display. The display may be a dedicated component of the navigation system 100 or may be used together with other vehicle systems, such as, for example, a multi-media system. The loudspeaker may be adapted to output speech information or spoken language to the user. The loudspeaker may be a dedicated component of the navigation system 100. Alternatively, the loudspeaker may be included in an audio system of a vehicle in which the navigation system 100 is installed. For example, the loudspeaker may be a component of a vehicle entertainment system, such as a car radio, CD player, MP3 player, tape player, or a combination of such devices. If the navigation system 100 shares use of the loudspeaker with a vehicle entertainment system, the navigation system 100 may include an interface to permit transmission of the output signals corresponding to navigation information to the vehicle entertainment signal. This may be accomplished via a communication link such as a digital data bus in the vehicle.

Additionally, or alternatively, the navigation system 100 may include an input device (e.g., a keypad). The processing unit 101 may be coupled to the input device to provide the user with control over functions of the processing unit 101. The input device may include suitably designed switches, buttons, a microphone for receiving speech information from the user, a keyboard, and/or any other mechanism or technique for inputting information to the navigation system 100.

In one example, the receiver 102 may be adapted to receive positioning information from a satellite based positioning system 105, a mobile communications network based positioning system 106, and/or an electronic toll collect based positioning system 107. Additionally, or alternatively, the positioning unit 101 may be coupled to sensors of a vehicle in which the navigation system 100 may be installed and/or operated. The sensors may include, for example, a speed sensor (e.g., a speedometer or a tachometer) indicating a current speed of the vehicle and/or a distance sensor (e.g., an odometer) indicating a distance the vehicle is moving. Additionally, or alternatively, the sensors may include a steering angle sensor indicating a current steering angle of the vehicle, an inclination angle sensor indicating an inclination angle the vehicle is driving up or down, a gyro sensor indicating a rotation of the vehicle body, an acceleration sensor indicating a current acceleration of the vehicle, or any other sensor configured to indicate an operating condition or parameter of the vehicle. In other words, the sensors may provide vehicle information related to an operating condition or parameter of the vehicle.

Figure 2:
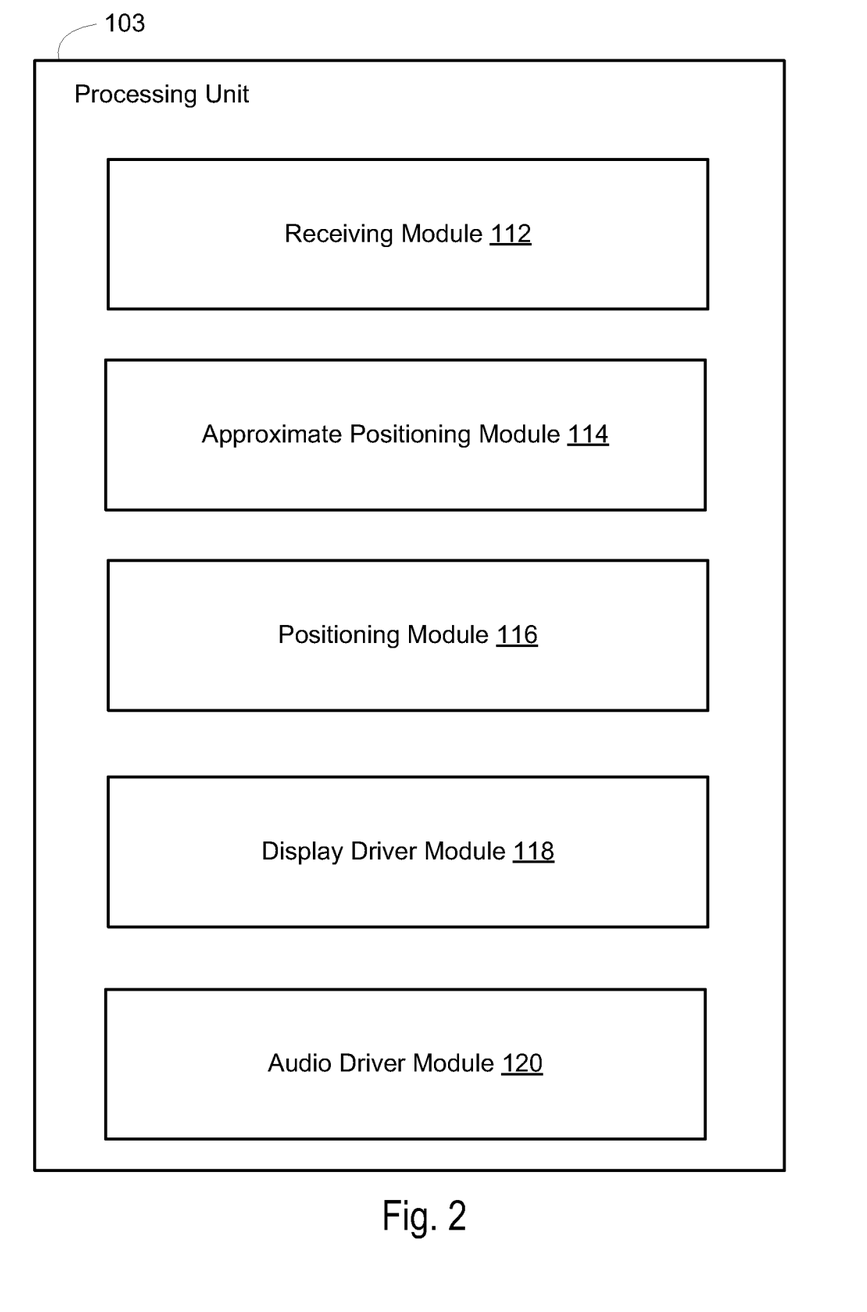
FIG. 2 shows one example of a processing unit.

In one example, as shown in FIG. 2, the processing unit 103 may execute a receiving module 112 configured to receive positioning information from the positioning unit 101 and/or the receiver 102, predefined parameter sets, geographical information (e.g., maps and/or geographical areas), and/or road information from the database, and/or vehicle information from, for example, the sensors. The processing unit 103 may include an approximate positioning module 114 configured to determine an approximate position of the navigation device. The processing unit 103 may include a positioning module 116 configured to determine a position of the navigation device. The processing unit 103 may include a display driver module 118 configured to present an appropriate output on the display and/or an audio driver module 120 configured to send an appropriate output to the loudspeaker. The term "module" may be defined to include one or more executable modules. As used herein, the terms "module" and "unit" may be used interchangeably. As described herein, the modules are defined to include software, hardware or some combination thereof executable by a processing unit (e.g., the processing unit 103). Software modules may include instructions stored in the database, or any other memory device, that are executable by the processing unit 103 or any other processor. Hardware modules may include various devices, components, circuits, gates, circuit boards, and the like that are executable, directed, and/or controlled for performance by the processing unit 103, or any other processor.

Figure 3:
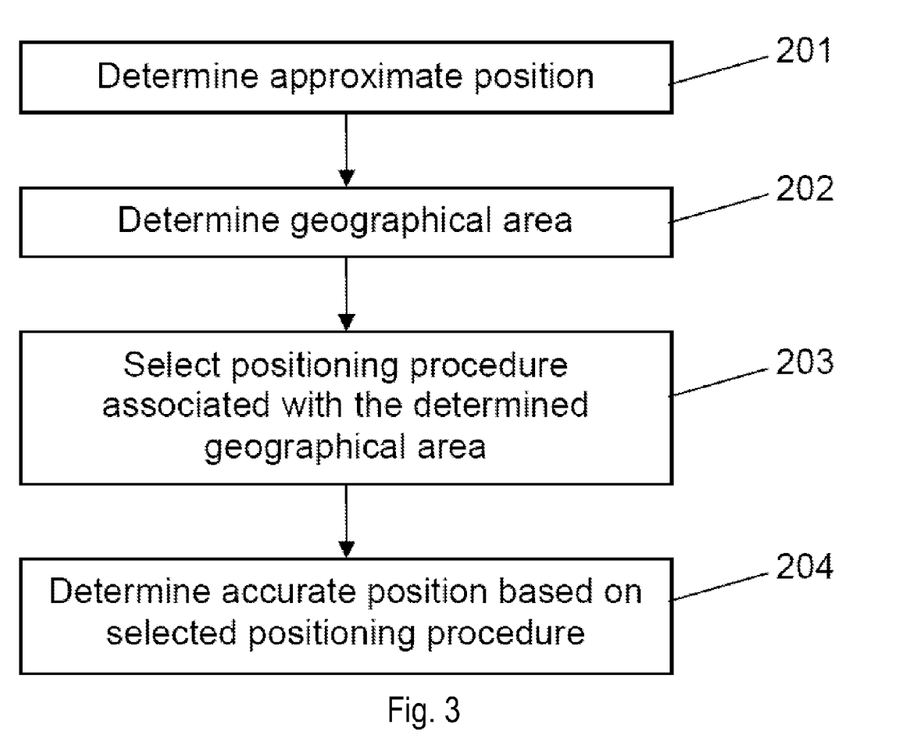
FIG. 3 shows a flow-chart of exemplary method steps for determining a position of a navigation device.

One exemplary operation of the navigation system 100 will now be described in more detail in connection with FIGS. 3 and 4.

In step 201, a rough or approximate position of the navigation device 100 may be determined. For example, the approximate position may be determined based on the satellite global positioning system (GPS) 105 or the mobile communications system 106. In one example, the approximate position may be determined based on a single positioning system. In other examples, the approximate position may be determined based on more than one positioning system. In one example, determination of the approximate position may be made without reference to the geographical area in which the vehicle is located and/or without reference to the predefined parameter sets (e.g., road information and/or vehicle information). In other words, the approximate position may not be based on the geographical area and/or the predefined parameter sets. In other examples, the approximate position may be based on the geographical areas and/or the predefined parameter sets. In one example, the approximate position may be determined based on the electronic toll collect system 107. For example, the approximate position may be determined based on the vehicle crossing a toll collect bridge. In one example, the approximate position may be determined based on the time that has elapsed since the vehicle last crossed a toll collect bridge. Additionally, or alternatively, the approximate position may be based on the speed of the vehicle (or other vehicle information) or the expected speed of the vehicle (or other road information) since the vehicle last crossed the toll collect bridge. In other words, the approximate position may be determined based on the speed of the vehicle and the time that has elapsed since the vehicle crossed the toll collect bridge. In another example, the approximate position may be determined based on a previously determined position and an offset determined based on the vehicle information. For example, the approximate position relative to the previously determined position (i.e., the offset) may be determined based on a speedometer signal, a tachometer signal, an odometer signal, a steering angle sensor, an inclination angle sensor, a gyro sensor, an acceleration sensor, and/or any other sensor configured to provide vehicle information for use by the navigation system 100. In one example, the approximate position relative to the previously determined position may be determined based on the direction of travel and the distance travelled from the previously determined position. The direction of travel and the distance travelled may be determined based on the vehicle information. For example, the distance travelled may be determined based on the speed of travel received via the speedometer signal and/or the tachometer signal or based on the distance received via the odometer signal. Additionally, or alternatively, the direction of travel may be determined based on the signal received via the gyro sensor, the steering angle sensor, or any other sensor configured to indicate direction (e.g., a compass sensor).

In step 202 the determined approximate position may be used to determine in which geographical area the navigation system is located. For example, as shown in FIG. 4, a map of a routing area 300 (e.g., a city, a country, a continent, or the whole world) of the navigation system 100 may include one or more geographical areas (e.g., geographical areas A, B, and C shown in FIG. 4). It should be recognized that the map of the routing area may include any number of geographical areas. In other words, the map of the routing area may be divided into any number of geographical areas. For reasons of clarity, the map of the routing area 300 shown in FIG. 4 includes only three geographical areas. In other examples, some areas of the routing area 300 may not be assigned to a specific geographical area as indicated by the area having no area letter in FIG. 3. In other words, the geographical areas may not cover the entire routing area 300, and a portion of the routing area may be located outside of the geographical areas. In one example, the portion of the routing area located outside of the geographical areas A, B, and C may be defined as a fourth geographical area (e.g., a default geographical area), which may be associated with a positioning procedure (e.g., the default positioning procedure). Based on the determined approximate position, in step 202, it may be determined if the navigation device is located in either region A, region B, region C, or in none of the regions A-C. In step 203, a positioning procedure associated with the determined geographical area or region may be selected. Any number of positioning procedures may be provided. In one example, the number of positioning procedures may be the same as the number of geographical areas, and each positioning procedure may be associated with a corresponding geographical area. Additionally, or alternatively, a default positioning procedure may be provided as further described below. In one example, the number of positioning procedures may be less than the number of geographical areas, and a positioning procedure may be associated with two or more geographical areas. In other examples, any number of positioning procedures may be provided and may be associated with any number of geographical areas. Each positioning procedure may rely on one or more positioning information sources and/or a predefined parameter set which may define how the information received from the information sources may be combined (e.g., which information sources are used and the weight given to each information source) to determine a position as described herein. In the example shown in FIG. 4, four positioning procedures 301 to 304 may be provided. Positioning procedure 301 may be associated with geographical area A; positioning procedure 302 may be associated with geographical area B; and positioning procedure 303 may be associated with geographical area C. Additionally, or alternatively, the default positioning procedure 304 may be provided. The default positioning procedure 304 may be associated with the portion of the routing area 300 that is located outside of the geographical areas A-C. Each positioning procedure may include a module (e.g., software or hardware) which may be used for determining the position of the navigation system and/or may include a parameter set which may be used for determining the position of the navigation system. In some examples, the module or parameter set may be associated with more than one positioning procedure. In other words, the modules or parameter sets of the various positioning procedures may be used in combination with one another. In step 204, a position of the navigation device, which may be more accurate than the approximate position, may be determined based on the selected positioning procedure.

Figure 4:
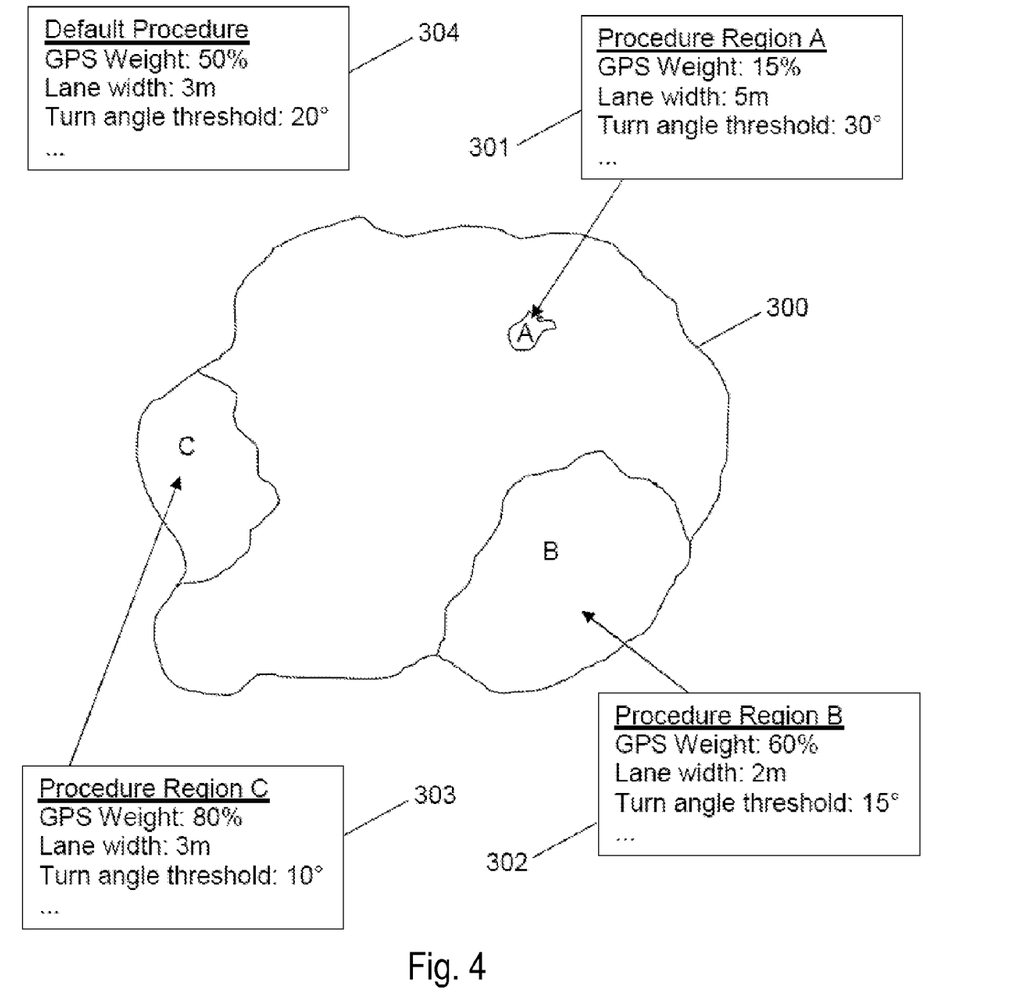
FIG. 4 shows one example of a plurality of geographical areas and associated positioning procedures.

As shown in FIG. 4, when the navigation device (e.g., the vehicle or the user) is located, for example, in region A, the selected positioning procedure may use a GPS weight of 15%, may assume a lane width for this region of 5 meters, and may use a turn angle threshold of 30°. In other examples, the selected positioning procedure may use any values for the GPS weight, the lane width, and/or the turn angel threshold. Additionally, or alternatively, other parameters may be defined by the positioning procedures (e.g., a weight for using positioning information of another satellite based positioning system such as, for example Galileo, a weight for using positioning information based on a mobile telecommunications network, or a weight for using positioning information based on an electronic toll collect system). In other examples, a weight for an inclination angle sensor and/or any of the other sensors described herein may be included in the positioning procedure. In one example, based on the inclination angle, it may be determined on which lane a vehicle is driving when two lanes are running close in parallel, one lane going up a hill, and the other lane going down the hill. In one example, when driving on a toll road having toll collect bridges for monitoring vehicles and collecting a toll, the position of the vehicle may be determined when the vehicle is crossing a toll collect bridge. In another example, when two roads are running close in parallel, one road being a toll road and the other being a toll-free road, it may be determined based on the toll collect system if the vehicle is driving on the toll road or on the toll-free road.

When, in step 202, no specific geographical area could be determined (i.e., in the example of FIG. 4, when it is determined that the vehicle is located in none of the areas A-C), in step 203 the default positioning procedure 304 may be selected for determining the position of the vehicle in step 204.

Thus, by using different positioning procedures and parameters in different geographical areas (e.g., cities), knowledge about typical positioning problems in certain geographical areas may be utilized to improve positioning. For example, in one city it may be a problem to correctly detect entrance and exit to roads having a lot of lanes, whereas in another city it may be a problem to detect a correct position of a vehicle in bifurcations and/or overhead roundabouts. By considering a lane width, a number of lanes, a turn angle threshold, and/or other parameters as stated above, positioning accuracy may be improved.

While various examples have been described above, various modifications may be implemented in other examples. For example, the navigation system 100 may include a gyro sensor and/or an inclination angle sensor. Thus, an improved positioning may be accomplished in a hand-held navigation device being used for walking or hiking or in a vehicle without being connected to sensors of the vehicle.

While various examples of the invention have been described, it will be apparent to those of ordinary skill in the art that many more examples and implementations are possible within the scope of the invention. Accordingly, the invention is not to be restricted except in light of the attached claims and their equivalents.

I claim:

1. A method for determining a position of a navigation device of a navigation system within a vehicle based on a plurality of positioning procedures, the method comprising the steps of:
   receiving a positioning information signal from a positioning information source;
   determining an approximate position of the navigation device based on the received positioning information signal, the approximate position being located within a routing area comprising a plurality of geographical areas, where one of the plurality of geographical areas comprises a default geographical area positioned outside of the others of the plurality of geographical areas;
   determining the geographical area in which the navigation device is located based on the approximate position of the navigation device;
   selecting one of the plurality of positioning procedures based on the determined geographical area, each positioning procedure associated with one of a plurality of predefined parameter sets; and
   determining the position of the navigation device within the vehicle according to the selected positioning procedure and the associated predefined parameter set, the associated predefined parameter set comprising road information corresponding to a road on which the vehicle is driving within the determined geographical area.

2. The method according to claim 1, where the associated predefined parameter set comprises a weighting of the positioning information source, and determining the position of the navigation device according to the selected positioning procedure and the associated predefined parameter set comprises determining the position of the navigation device based on the weighting of the positioning information source.

3. The method according to claim 1, where the positioning information source comprises at least one of a satellite based global positioning system, a steering angle sensor, a tachometer sensor, an inclination angle sensor, a gyro sensor, a mobile communications network based positioning system, or an electronic toll collect based positioning system.

4. The method according to claim 1, where the positioning information signal is a first positioning information signal, the positioning information source is a first positioning information source, and determining the position of the navigation device comprises receiving a second positioning information signal from a second positioning information source and determining the position of the navigation device according to the selected positioning procedure and the associated predefined parameter set based on the received first positioning information signal and the received second positioning information signal.

5. The method according to claim 1, where the road information comprises at least one of a lane width, a number of lanes, a turning angle threshold, or an expected speed corresponding to the determined geographical area.

6. The method according to claim 1, where the determined geographical area comprises at least one of an urban region, a rural region, a city, a mountainous region, a flat region, a country, a district area, or a road.

7. The method according to claim 1, where the plurality of positioning procedures comprises a default positioning procedure, and selecting one of the plurality of positioning procedures comprises selecting the default positioning procedure based on the determined geographical area being a default geographical area.

8. The method according to claim 1, where the positioning information source comprises an electronic toll collect based positioning system and determining the approximate position of the navigation device comprises determining that the navigation device has passed a toll collect area.

9. The method according to claim 1, where determining the approximate position of the navigation device comprises determining a previous position of the navigation device and an offset from the previous position of the navigation device based on vehicle information.

10. The method according to claim 9, where the vehicle information comprises at least one of a speed of the vehicle, a distance travelled by the vehicle, an acceleration of the vehicle, a steering angle of the vehicle, or a direction of the vehicle.

11. A navigation system comprising:
a processing unit adapted to determine a position of a navigation device of the navigation system within a vehicle based on a plurality of positioning procedures, each positioning procedure associated with a predefined parameter set;
a memory adapted to store the plurality of positioning procedures, the predefined parameter sets, and a plurality of geographical areas, each geographical area being associated with one of the positioning procedures, and where one of the plurality of geographical areas comprises a default geographical area positioned outside of the others of the plurality of geographical areas; and
a positioning unit adapted to determine an approximate position of the navigation device;
where the processing unit is adapted to determine the geographical area in which the navigation device is located based on the approximate position of the navigation device, to select the positioning procedure associated with the determined geographical area, and to determine the position of the navigation device within the vehicle according to the selected positioning procedure and the associated predefined parameter set; and
where the associated predefined parameter set comprises road information corresponding to a road on which the vehicle is driving within the determined geographical area.

12. The navigation system according to claim 11, where the road information comprises at least one of a lane width, a number of lanes, a turning angle threshold, or an expected speed corresponding to the determined geographical area.

13. The navigation system according to claim 11, where the road information comprises a turning angle threshold corresponding to the determined geographical area, and the processing unit is adapted to determine a lane change in response to a steering angle of the vehicle exceeding the turning angle threshold.

14. The navigation system according to claim 11, where the associated predefined parameter set comprises a weighting of a positioning information source, and the processing unit is adapted to determine the position of the navigation device based on the weighting of the positioning information source.

15. The navigation system according to claim 11, where an expected reception quality of the positioning information source in the determined geographical area is lower than an expected reception quality of the positioning information source in a second geographical area, and a second predefined parameter set corresponding to the second geographical area comprises a weighting of the positioning information source that is greater than the weighting of the positioning information source of the associated predefined parameter set.

16. The navigation system according to claim 11, where the navigation device comprises a mobile personal navigation device or a vehicle navigation device.

17. A non-transitory computer readable medium comprising a plurality of instructions executable by a processor, the tangible computer readable medium comprising:
instructions executable to determine an approximate position of a navigation device within a vehicle, the approximate position being located within a routing area comprising a plurality of geographical areas, where one of the plurality of geographical areas comprises a default geographical area positioned outside of the others of the plurality of geographical areas;
instructions executable to determine the geographical area in which the navigation device is located based on the approximate position of the navigation device; and
instructions executable to determine the position of the navigation device within the vehicle based on a predefined parameter set corresponding to the determined geographical area, the predefined parameter set comprising road information corresponding to a road on which the vehicle is driving within the determined geographical area.

18. The non-transitory computer readable medium according to claim 17, where the instructions executable to determine the approximate position of the navigation device are executable to determine a previous position of the navigation device and an offset from the previous position of the navigation device based on at least one of a speed or a distance.

19. The non-transitory computer readable medium according to claim 17, where the road information comprises at least one of a lane width, a number of lanes, a turning angle threshold, or an expected speed corresponding to the determined geographical area.

20. A method for determining a position of a navigation device of a navigation system within a vehicle based on a plurality of positioning procedures, the method comprising the steps of:
- receiving a positioning information signal from a positioning information source;
- determining an approximate position of the navigation device based on the received positioning information signal, a determined previous position of the navigation device and an offset from the previous position of the navigation device based on vehicle information, the approximate position being located within a routing area comprising a plurality of geographical areas;
- determining the geographical area in which the navigation device is located based on the approximate position of the navigation device;
- selecting one of the plurality of positioning procedures based on the determined geographical area, each positioning procedure associated with one of a plurality of predefined parameter sets; and
- determining the position of the navigation device within the vehicle according to the selected positioning procedure and the associated predefined parameter set, the associated predefined parameter set comprising road information corresponding to a road on which the vehicle is driving within the determined geographical area.

21. A navigation system comprising:
- a processing unit adapted to determine a position of a navigation device of the navigation system within a vehicle based on a plurality of positioning procedures, each positioning procedure associated with a predefined parameter set;
- a memory adapted to store the plurality of positioning procedures, the predefined parameter sets, and a plurality of geographical areas, each geographical area being associated with one of the positioning procedures; and
- a positioning unit adapted to determine an approximate position of the navigation device based on a determined previous position of the navigation device and an offset from the previous position of the navigation device based on vehicle information;
- where the processing unit is adapted to determine the geographical area in which the navigation device is located based on the approximate position of the navigation device, to select the positioning procedure associated with the determined geographical area, and to determine the position of the navigation device within the vehicle according to the selected positioning procedure and the associated predefined parameter set; and
- where the associated predefined parameter set comprises road information corresponding to a road on which the vehicle is driving within the determined geographical area.

22. A non-transitory computer readable medium comprising a plurality of instructions executable by a processor, the tangible computer readable medium comprising:
- instructions executable to determine an approximate position of a navigation device within a vehicle based on a determined previous position of the navigation device and an offset from the previous position of the navigation device based on vehicle information, the approximate position being located within a routing area comprising a plurality of geographical areas;
- instructions executable to determine the geographical area in which the navigation device is located based on the approximate position of the navigation device; and
- instructions executable to determine the position of the navigation device within the vehicle based on a predefined parameter set corresponding to the determined geographical area, the predefined parameter set comprising road information corresponding to a road on which the vehicle is driving within the determined geographical area.

* * * * *